(12) United States Patent
Bratten et al.

(10) Patent No.: US 7,913,854 B2
(45) Date of Patent: Mar. 29, 2011

(54) FILTER APPARATUS AND METHOD WITH SIMPLIFIED FILTER BELT INDEXING AND SEALING

(76) Inventors: Jack R. Bratten, Orchard Lake, MI (US); Bryn Hartshorne, Novi, MI (US)

( * ) Notice: Subject to any disclaimer, the term of this patent is extended or adjusted under 35 U.S.C. 154(b) by 1377 days.

(21) Appl. No.: 11/370,393

(22) Filed: Mar. 7, 2006

(65) Prior Publication Data

US 2007/0210013 A1 Sep. 13, 2007

(51) Int. Cl.
*B01D 33/04* (2006.01)
*B01D 33/056* (2006.01)

(52) U.S. Cl. .......................... 210/400; 210/783
(58) Field of Classification Search .......................... None
See application file for complete search history.

(56) References Cited

U.S. PATENT DOCUMENTS

| | | | | |
|---|---|---|---|---|
| 3,006,479 A * | 10/1961 | Wallny | ........................... | 210/401 |
| 3,347,378 A * | 10/1967 | Arnold et al. | ................. | 210/106 |
| 3,464,557 A * | 9/1969 | Fowler | ............................. | 210/97 |
| 3,807,559 A * | 4/1974 | Horn | ............................. | 210/780 |
| 4,145,288 A * | 3/1979 | Crowe | ........................... | 210/111 |
| 4,147,635 A * | 4/1979 | Crowe | ........................... | 210/401 |
| 4,390,428 A * | 6/1983 | Bratten | ........................ | 210/400 |
| 4,421,645 A * | 12/1983 | Creps et al. | .................... | 210/260 |
| 4,430,231 A * | 2/1984 | Bratten | ........................ | 210/783 |
| 4,481,108 A | 11/1984 | Bratten | | |
| 4,514,301 A * | 4/1985 | Parshall | ........................ | 210/400 |
| RE32,135 E * | 5/1986 | Creps et al. | .................... | 210/260 |
| 4,842,749 A * | 6/1989 | Cox | ............................. | 210/783 |
| 5,006,233 A * | 4/1991 | Muisener | ..................... | 210/96.1 |
| 5,599,462 A * | 2/1997 | Kemp | ........................... | 210/783 |
| 5,601,729 A | 2/1997 | Bratten | | |
| 5,624,579 A * | 4/1997 | Bratten | ........................ | 210/783 |
| 5,921,399 A * | 7/1999 | Bakula et al. | ................. | 209/272 |
| 6,066,255 A | 5/2000 | Anderson | | |
| 6,093,315 A * | 7/2000 | Croket | ..................... | 210/167.02 |
| 6,277,276 B1* | 8/2001 | Bratten | ........................ | 210/223 |
| 6,358,406 B1* | 3/2002 | Hirs | ............................. | 210/90 |
| 6,495,031 B1* | 12/2002 | Bratten | ........................ | 210/97 |
| 6,846,421 B2* | 1/2005 | Bratten | ........................ | 210/741 |
| 7,048,850 B2* | 5/2006 | DePaso et al. | ................. | 210/155 |
| 7,614,503 B2* | 11/2009 | Marchal | ........................ | 210/401 |
| 7,824,547 B2* | 11/2010 | Reynders et al. | ............. | 210/171 |
| 2003/0121843 A1* | 7/2003 | Bratten | | 210/398 |
| 2007/0210013 A1* | 9/2007 | Bratten et al. | ................. | 210/783 |
| 2009/0242469 A1* | 10/2009 | Calabrese | ..................... | 210/122 |

* cited by examiner

*Primary Examiner* — Robert James Popovics
(74) *Attorney, Agent, or Firm* — John R. Benefiel

(57) ABSTRACT

A filter apparatus includes a endless filter belt loop disposed in an interior space within a tank which receives liquid to be filtered. The filter belt has a series of closely spaced parallel guide-flight bars attached which are successively engaged by an extendible element on a pivot plate which is periodically oscillated to under the filter belt. The bars are received in guide spaces to hold the filter belt in position over a filter support having openings allowing filtering flow therethrough. Collapsible sealed hoses partially filled with liquid are used as edge seals extending along the guide spaces over side edges of the filter belt and are expanded by engagement of an upper end of each of the hoses with a squeeze member on the pivot plate. The squeeze members are moved off the hoses when the pivot plate is oscillated to advance the filter belt during indexing to release the sealing pressure and allow filter belt indexing movement. The pivot plate oscillation also operates a beater bar to guide the belt to dislodge solids from the belt. In a vacuum version, the filter belt support is provided by molded plastic support pieces assembled over a solid curving support plate in the tank.

11 Claims, 12 Drawing Sheets

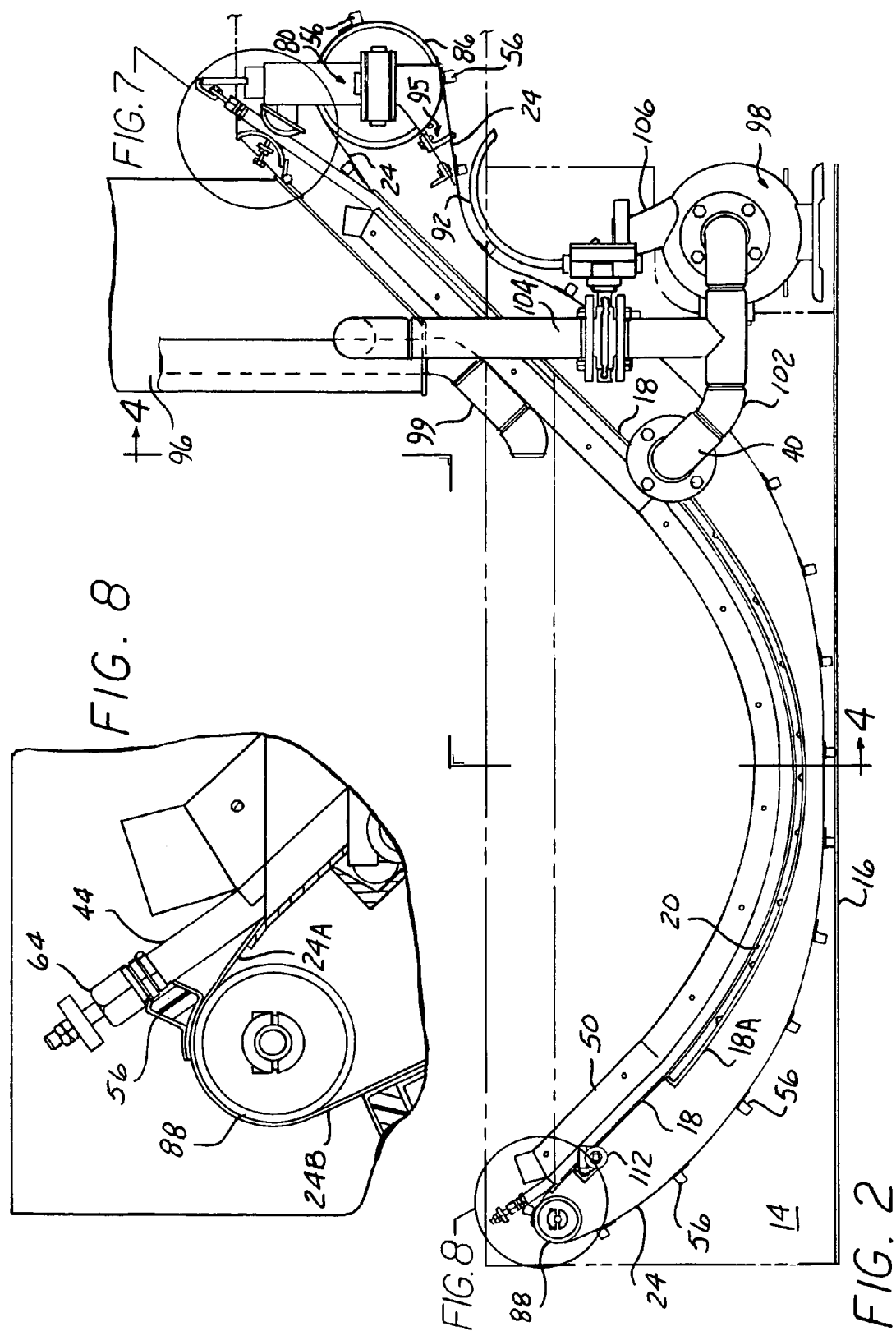

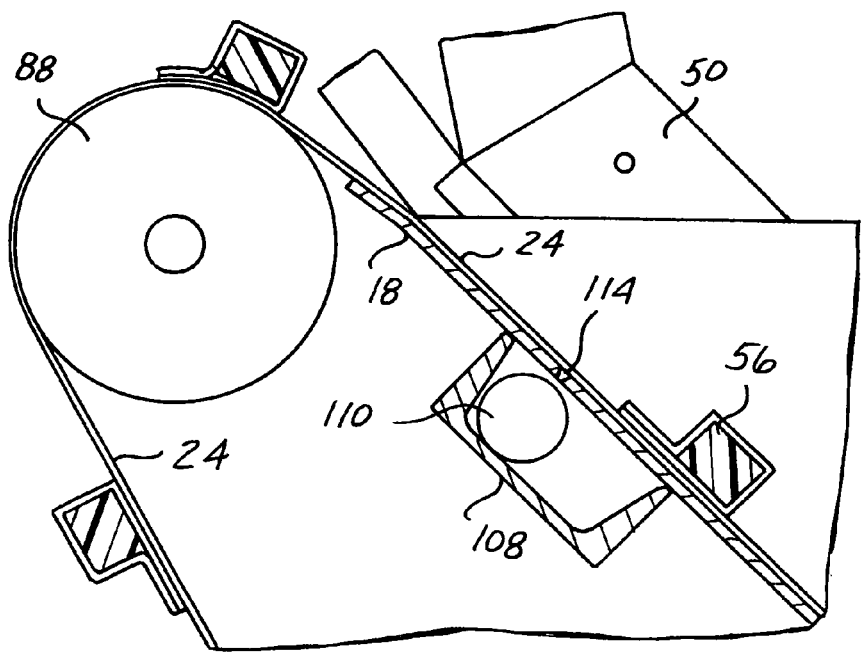
FIG. 11
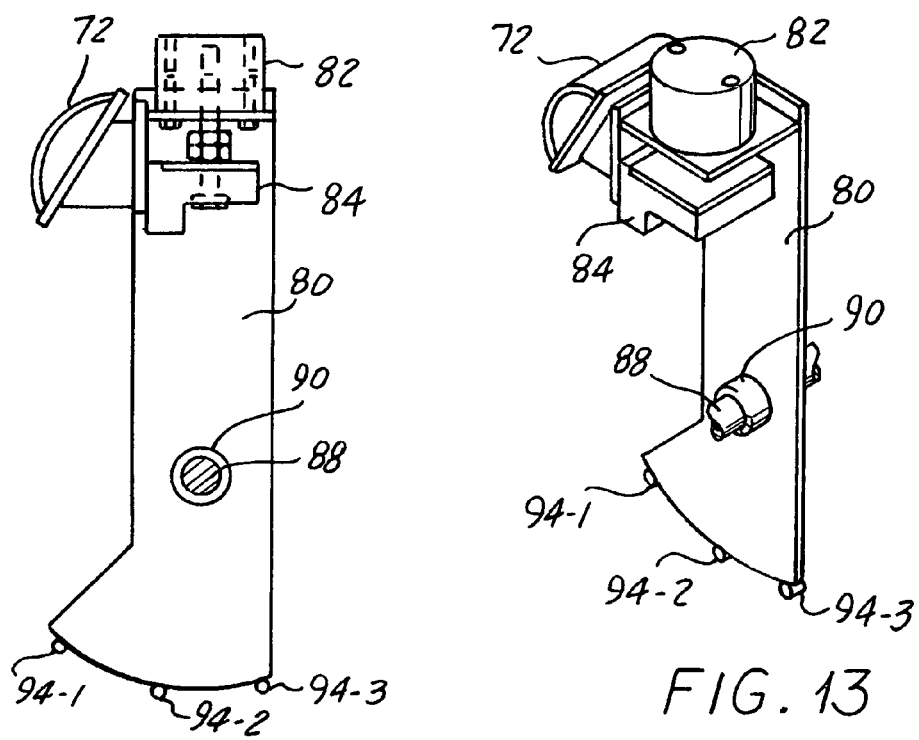
FIG. 12
FIG. 13

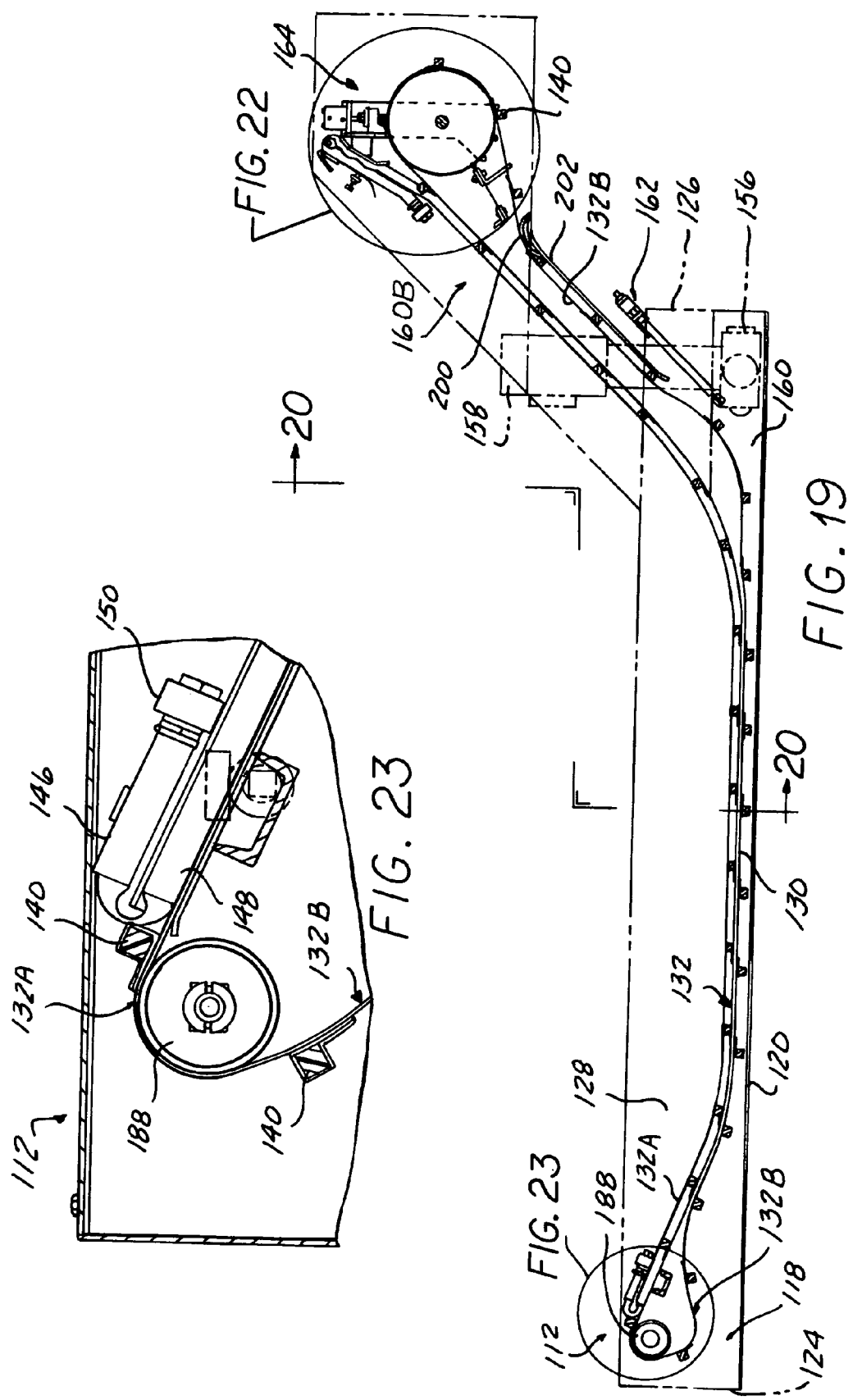

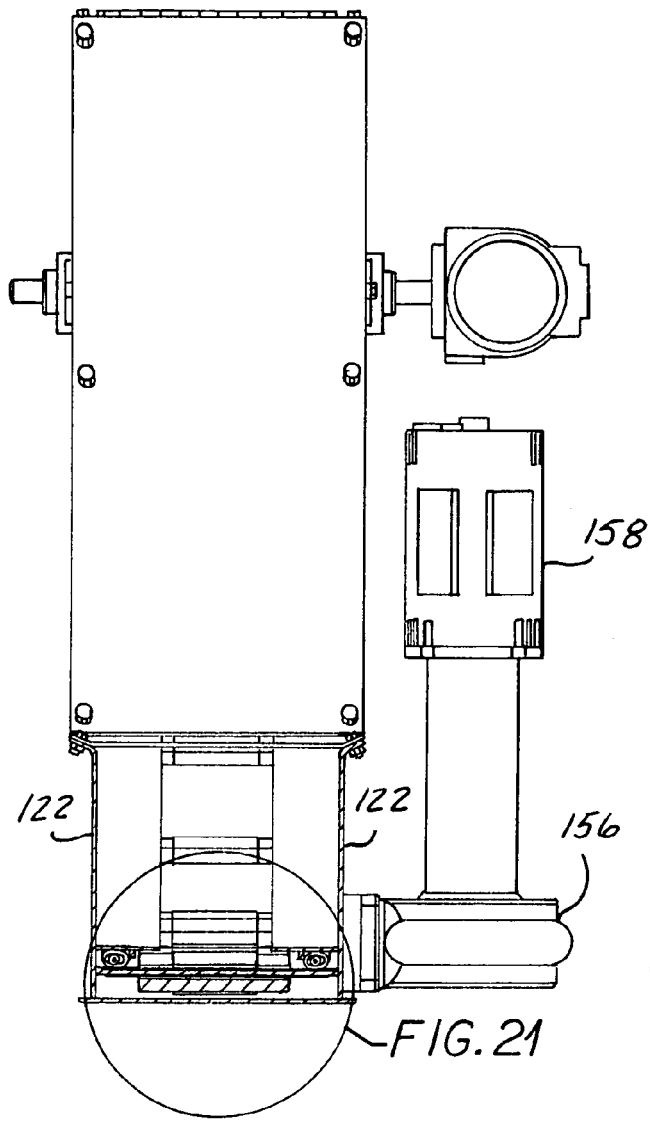
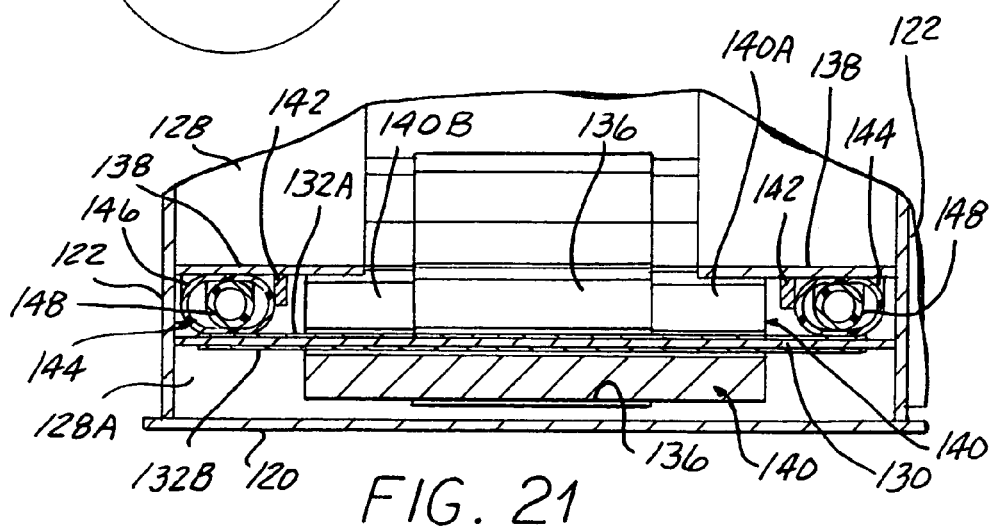

FILTER APPARATUS AND METHOD WITH SIMPLIFIED FILTER BELT INDEXING AND SEALING

BACKGROUND OF THE INVENTION

This invention concerns filters and more particularly liquid filters of a type including a filter media disposed in a tank into which liquid to be filtered is collected. The filter media often takes the form of a strip of paper or woven fabric material.

The filter media is disposed over a support having perforations or other openings allowing liquid to flow through the support after passing through the filter media to be filtered. The filtered liquid is collected in a space below the support.

A typical use is in filtering machining coolant/lubricant to remove chips and fine particles.

The chips or other solid debris accumulate atop the filter media and must be periodically removed from the tank.

In conventional filter apparatus of this type, a filter media belt is arranged to be periodically advanced incrementally to bring a section of the filter media to a location at one end of the tank where the chips and accumulated solids are discharged.

The filter media has taken two different forms, i.e. a woven fabric belt formed into an endless loop providing a "permanent" media and a disposable media comprised of a paper strip which fed in at one end of the tank and discharged for disposal at the other end.

The permanent media passes around a roller at each end of the tank so as to be recirculated through the tank with repeated indexing.

Periodic indexing of the filter belt allows the solids such as chips filtered out of the liquid to be progressively carried out of the tank by a series of incremental movements, and successive sections of the belt moved back into position for continued filtering.

The filter media also typically becomes clogged with fine solids after continued operation requiring cleaning of each section, as by being washed with clean liquid.

Disposable media is simply collected and discarded with the chips and other solids. This type of filter using a disposable media is described in U.S. Pat. No. 4,481,108 granted to the present inventor.

Disposable media filters may be more expensive to operate and entail a greater maintenance burden due to the need to stock and replace rolls of media and to collect and dispose of the used media.

For this reason, a filter apparatus using only permanent media belt filter may be lower in cost to operate and therefore may be preferable to some users, at least for some applications.

Filter apparatus using this type of filter media is shown in U.S. Pat. Nos. 6,066,255 and 4,390,428.

In some filter apparatus, both disposable and permanent media are used.

Both types of filter apparatus are sometimes provided with sealing to prevent dirty liquid from passing around the side edges of the filter belt or strip to allow dirty liquid to bypass the filtering action.

One type of seal comprises lengths of inflatable tubing extending along and over the side edge of the media which is inflated to press the media edges against a guide surface to seal the same, as described in the '108 patent referenced above. An inflatable filter belt seal is also shown in U.S. Pat. Nos. 4,390,428 and 5,601,729.

This type of edge sealing is effective but the tubing needs to be deflated during indexing to allow movement of the filter belt when a fresh belt segment is moved over the perforate support. This necessitates the use of control valves and a source of air pressure adding to the complexity and cost of the apparatus.

Depending on the size of the filter and the type of solids being filtered out, a conveyor may be required in addition to the filter media as in order to move a large volume of chips out of the tank. Typically, the conveyor comprises a series of vertical flight plates connected together with chain loops at either of the ends of the flight bars. The flight plates are arranged on edge and extending across the filter media and in engagement therewith to hold down and drive the bars media. The flights are primarily intended to act as a conveyor to carry large volumes of chips out of the tank.

The flights being made of metal are heavy, and their weight is used to hold the permanent media belt against the perforated support plate, as there may be a tendency for the belt to float up and allow dirty liquid to flow around the edges of the belt.

The flight conveyor chains and plates add substantially to the cost of the apparatus, as they must also be mounted, driven and controlled in similar fashion to the permanent media belt.

In other filter apparatus, such as shown in U.S. Pat. No. 6,066,255, drive chains are attached to the filter media belt to directly drive the same. This arrangement also is complicated and costly and sometimes causes bunching and wadding of the media belt, etc. as the belt may stretch or shrink relative the chain loops.

It is the object of the present invention to provide a low cost and simple filter apparatus of the permanent media belt type described.

It is another object to provide a filter media belt which simplifies the indexing drive and eliminates the need for a separate chip conveyor.

SUMMARY OF THE INVENTION

The above objects and other objects which will become apparent upon a reading of the following specification and claims is achieved by providing a permanent filter media belt loop mounted for incremental indexing movement through a tank.

The filter belt is driven to produce periodic indexing movement by a simplified indexing drive successively engaging each of a series of light weight drive-flight bars mounted to the belt as by being held in pockets spaced along the filter belt, which also act as conveyor flights to produce a combination permanent media belt and conveyor capable of carrying solids such as machining chips out of the tank. The relatively closely spaced drive-flight bars have opposite ends protruding out of the associated pocket which are confined by guide surfaces fixed on each side of the filter belt to insure that belt remains positioned against the filter belt support through the curved portions of the support surface even when being indexed.

The indexing drive mechanism includes an engagement element such as a stepped shape engagement block on each side of the media belt which are extendible with an associated actuator to engage a respective end of each drive-flight bar. The blocks have a stepped shape to mate with each bar end when the associated actuators extend a plunger on which each block is mounted.

The assembly of each block and associated actuator are each mounted on a respective pivot plate pivotable about an axis centered on a filter media return idler drum, attached to a concentric shaft passing through the center of the idler drum.

A reversible rotary actuator is connected to the shaft so that when both engagement blocks are engaged, pivoting of the pivot plates causes indexing the filter belt. Upon retraction and disengagement of the blocks and reverse rotation of the rotary actuator back to a start position, the blocks are in position to begin the next indexing cycle over the succeeding drive flight bar.

The drive-flight bars are sufficiently high, approximately three quarters of an inch to an inch or more in height and preferably approximately square in section, to also act as conveyor flights to capture solid debris as the belt ascends a tank incline out of the liquid in the tank, so that the filter belt acts as a conveyor as the belt is repeatedly and incrementally advance by the periodic indexing to progressively carry chips and other solids out of the liquid to an elevated end of the tank, where they are discharged.

A simplified filter belt edge sealing arrangement is also provided, comprised of a pair of sealed flat tenable tubes or hoses mounted in a confined space extending along and over each filter belt edge. A smaller diameter tube is disposed within each flattenable hose to partially distend each flat hose to minimize the extent of compression is necessary to inflate the hose. A squeeze plate is attached to each pivot plate to be rotated against a respective hose when moved to the start position, compressing the same to expand the hoses and generate sealing pressure on the filter belt edges.

This eliminates the control valve formerly needed to pressurize and depressurize the seal by independent means.

The pivot plates may also be used to retract a spring mounted beater bar which then springs back and strikes the filter belt to dislodge solids therefrom. This occurs several times in each indexing cycle, and likewise does not require any additional controls.

According to another aspect of the present invention, the vacuum box support for the filter belt within the tank can advantageously be provided by interfit elastomeric mats or pieces, each having flow openings therein which are installed on a continuously curving tank partition wall so as to form a filter belt support surface extending through the tank to eliminate a tighter single bend needed to ascend out of the tank and to shorten the overall length of the tank.

The drive-flight bars have ends contained within guide surfaces which together with the relatively close spacing of the bars act to hold the filter belt in position against the support surface so that light weight plastic bars can be used to eliminate the chains and metal flights formerly used. Mechanically connected chains driving the filter belt are also not required.

DESCRIPTION OF THE DRAWINGS

FIG. 2 is a front elevational view of the filter apparatus shown in FIG. 1 with the front tank wall removed to show the interior components.

FIG. 8 is an enlarged view of the detail shown in the circle 8 in FIG. 2.

FIG. 11 is an enlarged end view of the belt washer components.

FIG. 12 is an elevational of one of the pivot plate assemblies included in the filter apparatus shown in FIG. 1.

FIG. 13 is a pictorial view of the pivot plate assembly shown in FIG. 12.

FIG. 19 is an elevational view with the front wall removed of the apparatus shown in FIG. 18.

FIG. 20 is a view of the section 20-20 in FIG. 18.

FIG. 21 is an enlarged view of the components enclosed in the circle 21 in FIG. 20.

FIG. 23 is an enlarged view of the components in the circle 23 in FIG. 19.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
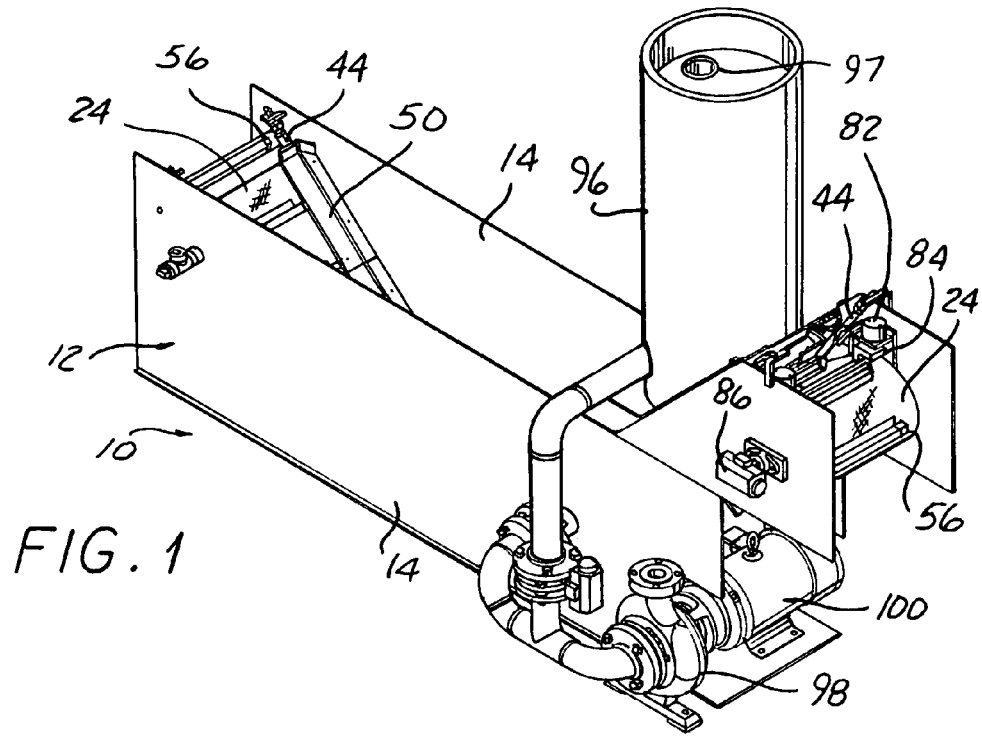
FIG. 1 is a pictorial view of a filter apparatus according to the present invention.

Referring to the drawings and particularly FIG. 1, a vacuum filter apparatus 10 is depicted incorporating features of the present invention.

A generally rectangular tank 12 open to atmospheric pressure is adapted to receive contaminated liquid to be filtered, typically directed therein through a pipe (not shown).

The tank 12 includes opposite side walls 14, and a bottom wall 16 typically fabricated from steel plates.

A curving solid partition plate 18 extends lengthwise along the tank 12, held between the two sidewalls 14. A stepped recess 20 is formed along the lowest segment 18A of the partition plate 18 to accommodate a series of interfit planar rectangular support pieces 22 which are just thick enough so that the upper surface thereof is flush with the adjacent portions of the partition plate 18.

This provides a substantially continuous support surface for a segment of woven fabric filter belt loop 24 which has an upper run 24A overlying the support pieces 22.

Figure 9:
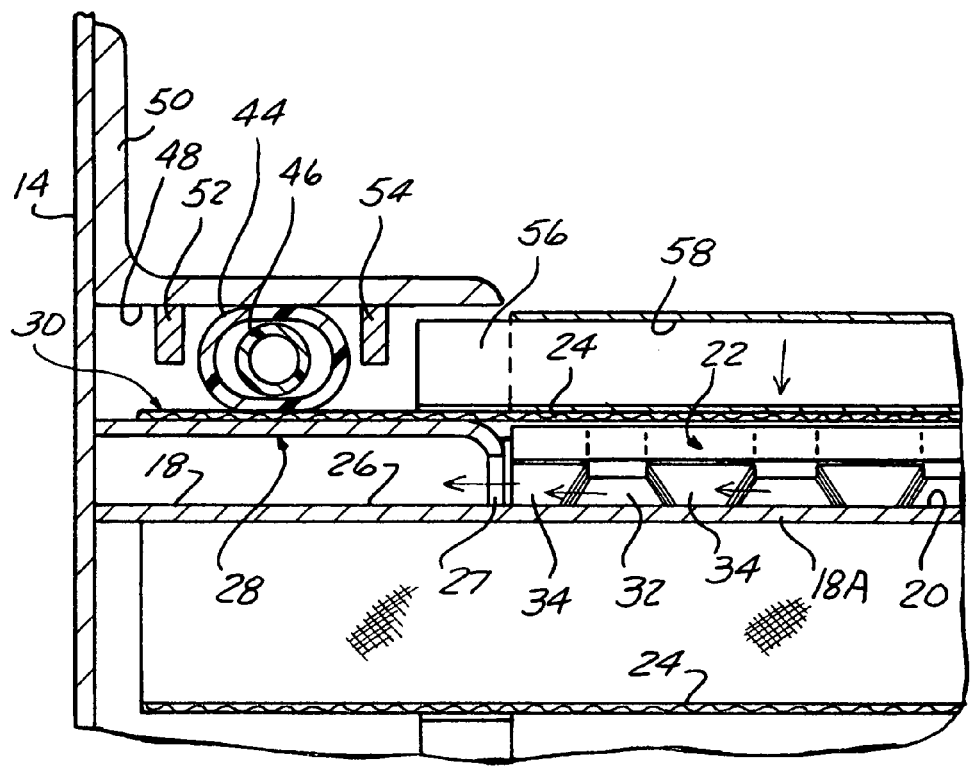
FIG. 9 is a further enlarged portion of a transverse section through the filter apparatus showing the flow paths of the filtered liquid.

A pair of respective side channels 26 are formed by inverted angles 28 welded to the outer edge of the lower partition plate segment 18A in the region of the recess 20 to create adjacent slightly raised surfaces 30 over which the edges of the advancing segment 24D of the filter belt 24 are supported as best seen in FIG. 9.

The support pieces 22 are preferably commercially available molded plastic "cushion tiles" conventionally used to create floor matting by being arranged in an array and hooked together to form a larger area substantially continuous filter media support surface.

Openings 32 are formed by a grid pattern in the pieces 22 with short feet 34 at each corner of the grids creating flow spaces in both through directions and lengthwise directions underneath the surfaces of the support pieces 22.

Liquid is drawn through the filter belt 24 in the region overlying the support pieces 22 and passes into these clearance spaces. Some of the flow is to the side and is collected in the channel space 26 on either side of the support pieces 22 through holes 27 in the side of the angles 28. Additional flow occurs in a lengthwise direction under the support pieces 22 which is collected in a cross channel 36 formed by an inverted channel piece 38 welded or otherwise connected to the tank two side walls 14 and on one side is connected to the suction inlet 40 of a pump 42.

The side channels 26 open into the cross channel 36 to direct all flow to the pump inlet 40. Since flow occurs in both sideways and lengthwise directions beneath the pieces 22, an adequate flow area is provided despite the shallow depth of the recess 20.

The pieces 22 are designed to be hooked together and may be trimmed as needed to form an uninterrupted support for the advancing segment of the filter best 24.

The pieces 22 are molded from an elastomeric material to be flexible, and to be able to conform to the continuously curved lower segment support plate 18A to provide a durable filter belt support at low cost.

The curved bottom of the plate 18A is advantageous since this eliminates the tight corners normally required to create the redirection necessary to produce ascent of the filter belt 24 out of the liquid. Such corners are disadvantageous since the fabric filter belt 24 tends to be pulled away from a tightly curved support when the filter belt 24 is indexed, as will be described in detail below.

A seal is provided for each side edge of the advancing segment of the filter belt 24A against each of the guide surfaces 30. This seal comprises a pair of sealed compliant tubes or hoses 44, each containing a volume of liquid sufficient to mostly but not completely fill and inflate the hoses 44, and also having an inner stiffer round tube 46 which is smaller in diameter and which maintains its round shape to partially distend the compliant hoses 44 and reduce the extent of compression needed to fully inflate the hoses 44.

The hoses 44 are pressurized except during indexing, as will be described in order to press the edges of the filter belt 24 against the guide surfaces 30 to create sealing pressure thereon. An upper surface guide 48 is created over each hose 44 by a series of angles 50 welded to each side wall 14 to confine the hoses 44. A pair of guide bars 52 and 54 confine the hoses 44 laterally, with guide bars 54 also guiding the exposed end of a spaced apart series of drive-flight bars 56 mounted extending parallel to each other and across the width of the filter belts, distributed along the entire length of the filter belt 24.

Figure 10:
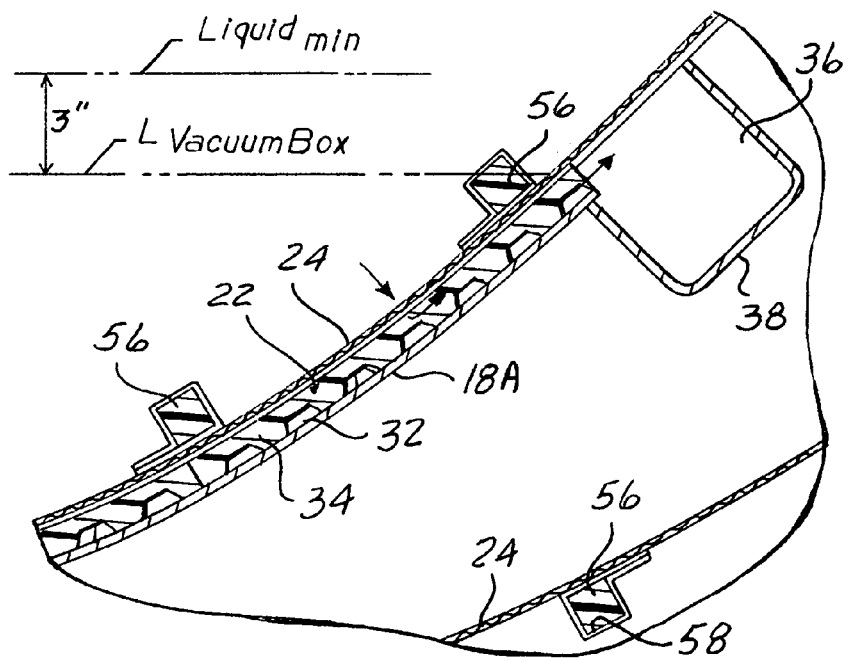
FIG. 10 is a fragmentary enlarged view of a part of the tank and vacuum box components of the filter apparatus shown in FIG. 1.

The ends of the filter belt 24 are connected together by clips in the well known fashion to form an endless loop which is incrementally recirculated by periodic indexing, with a return run 24B extending beneath the partition plate 18 as seen in FIGS. 1 and 10.

Figure 15:
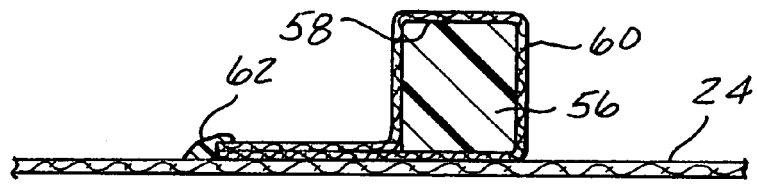
FIG. 15 is an edge view of the filter belt assembly segment shown in FIG. 14.

The drive-flight bars 56 may be mounted to the filter belt 24 by being tightly received in pockets 58 formed by fabric flaps 60 each formed into a loop defining a pocket 58, the ends sewn to the upper surface of the filter belt 24 as seen in FIG. 15. The exposed ends of the fabric forming the pockets preferably have a layer of polyurethane coating 62 to prevent fraying.

Figure 14:
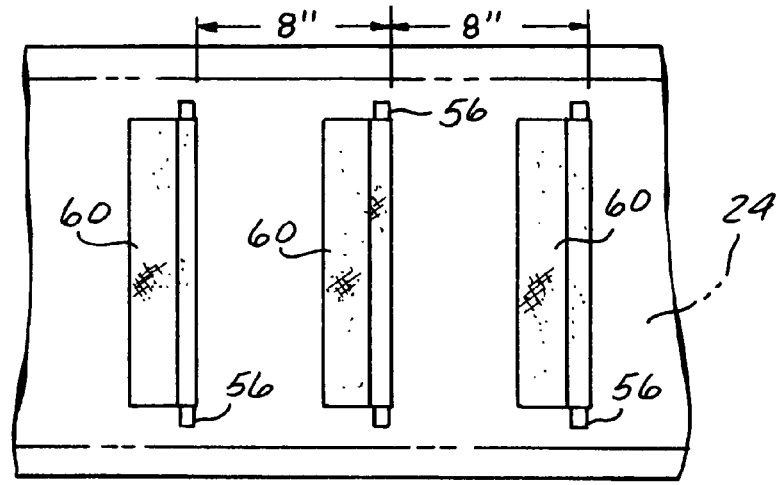
FIG. 14 is a plan view of a fragmentary segment of a filter belt assembly included in the filter apparatus shown in FIG. 1.

The drive-flight bars 56 are relatively closely spaced to each other along the filter belt 24 at regular intervals related to the length of indexing travel, i.e. such as an 8 inch pitch (FIG. 14).

Figure 5:
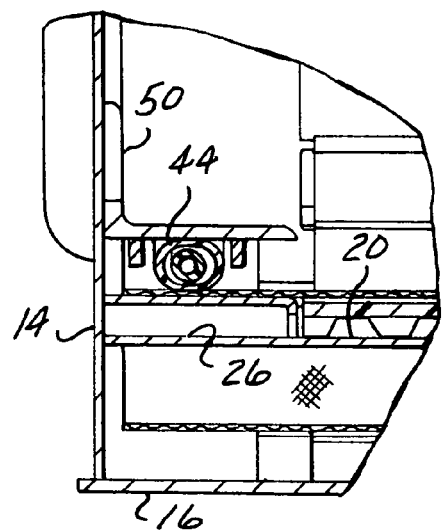
FIG. 5 is an enlarged view of the detail shown in circle 5 in FIG. 4.
Figure 6:
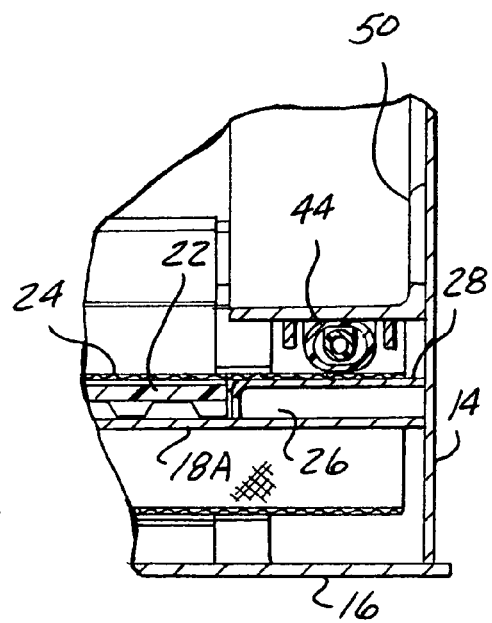
FIG. 6 is an enlarged view of the detail shown in circle 6 in FIG. 4.

The pockets 58 are shorter than the full width of the filter belt 24 so that the ends of the drive-flight bars 56 are exposed and extend partially over the side edges of the filter belt 24, but terminate well short of the outermost edges as seen in FIGS. 5 and 6, to provide space for the hoses 44 and exposed filter belt side bands to enable sealing thereof.

The drive-flight bars 56 may be constructed of a durable plastic such as polypropylene or polyethylene which are suitably lightweight and present a low friction surface.

The drive-flight bars 56 are of a substantial height, i.e. approximately ¾" to 1¼" in height so as to be able to act as conveyor flights and to reliably positively engaged to carry out indexing. That is, chips can be captured by the drive-flight bars 56 as the filter belt advancing segment 24 ascends the exit side of the partition plate 18 (to the right as viewed in FIG. 1). The chips (or other solids) would otherwise slide back down the filter belt 24 if the bars 56 were not included.

The drive-flight bars 56 also serve the purpose of holding the filter belt 24 down in position over the support sections 22, preventing float as the ends thereof are confined by the undersurface 48 of the angles 50.

The flight bars 56 are relatively closely spaced, i.e. typically, 8 inches apart, so that the filter belt 24 does not lift off the curved surfaces even when the filter belt is being pulled during an index cycle. The guiding by the drive-flight bars 56 also acts to counter any tendency of the filter belt 24 to float, as is sometimes caused by the formation of air bubbles beneath filter belts.

Thus, the need for a separate flight conveyor is avoided by the integrated filter belt and conveyor achieved by the addition of the drive-flight bars 56.

The flight bars 56 also provide a reliable positive drive feature for accomplishing indexing movement of the filter belt 24 in order to convey chips out and to allow cleaning of successive sections of the filter belt 24 as will be described below.

Figure 7:
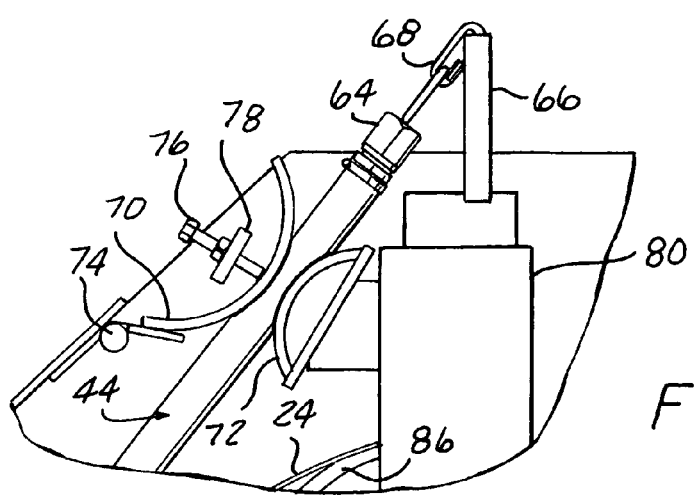
FIG. 7 is an enlarged view of the detail shown in circle 7 in FIG. 2.
Figure 4:
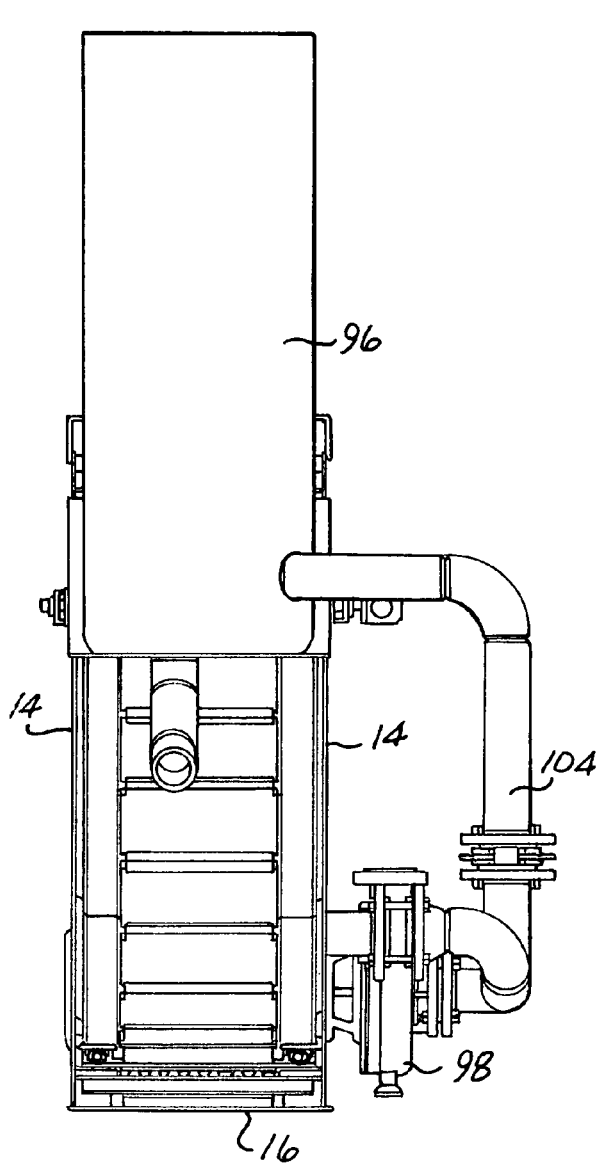
FIG. 4 is a view of the transverse section 4-4 taken in FIG. 2.

Each end of the compliant hoses 44 is plugged with a fitting 64 having a threaded stem passed through a support plate 66 welded to a respective side plate 14 on the left end. The right end is plugged with a fitting 64, but held by the plate 66 welded to a side wall 14 and hook 68 (FIG. 7). A liquid is contained within each hose 44 to partially inflate the same.

In their partially inflated state, the hoses 44 do not exert a significant pressure on the side edges of the filter belt 24.

However, the right upper end of each hose 44 is normally squeezed between an associated pair of opposed curved plates 70, 72. The curved anvil plate 70 is hinged at 74 to be adjustably located towards and away from the squeeze plate 72 (FIG. 7) by an adjustment bolt 76 threaded into a fixed plate 78 and having a protruding end engaging the inside of the plate 70.

Each squeeze plate 72 is mounted to an associated rotary pivot plate 80 which is normally positioned as shown in FIG.

7 in which the upper end of the associated hose 44 is squeezed as shown. This expands the remaining length of the hoses 44 to exert a sealing pressure on a respective side band of the filter belt 24 to establish a seal preventing bypass flow of liquid around the filter belt edges.

Each pivot plate 80 also mounts a short stroke linear actuator 82 having a downwardly directed plunger attached to an engagement element here comprised of a stepped block 84 positioned above an idler drum 86 around which the filter belt 24 is routed to be recirculated back into the tank as successive index cycles occur.

A second smaller diameter idler drum 88 is located at the opposite end of the tank 12 to complete the recirculation path of the filter belt 24.

The stepped block 84 on each side of the filter belt 24 is located above a respective exposed end of a drive-flight bar 56 with the riser part of the block stepped shape located behind the rear face of the driver-flight bar 56.

As will be described hereinafter, at the beginning of each index cycle initiated by a timer included in the system controls (not shown), linear actuator 82 is activated causing the stepped block 84 to descend and rest against the top of the respective end of the flight bar 56. The pivot plate 80 is then advanced clockwise to engage the drive-flight bar 140 and thereafter begins pulling the filter belt 24 to the right, by means of an associated rotary actuator 86 and a cross shaft 88 which is connected to each pivot plate 80 by a set of collars 90 on each plate 80. When this occurs, the curved squeeze plates 72 are both moved away from their respective hoses 44 to relieve the sealing pressure, and allow the filter belt 24 to be free to be advanced.

The filter belt 24 is passed around over a curved return guide plate 92 with successive indexing incremental movements.

The pivot plate 80 also has an arced opposite edge having three contact rods 94-1, 94-2, 94-3 affixed thereto which successively engage a belt beater angle 95 as the actuator plate 80 is pivoted through an arc.

Each rod 94-1, 94-2, 94-3 causes an angle 95 to be pushed up bending up a spring steel sheet holding the angle 95, and thereafter releases the same to cause impact of the angle 95 against the inside of the belt 24, knocking loose any solids on the belt 24. This happens three times during each pivoting of the pivot plate 80.

The movement of the filter belt 24 at full advance of the pivot plate 80 is slightly greater than the 8 inch pitch of the drive-flight bars 56, so that upon retraction of the stepped blocks 84 and return to the start position, the stepped blocks 84 are again properly aligned with the rise surface spaced slightly behind the rear face of the next flight bar 56 to insure engagement therewith when the next indexing cycle is initiated.

As per conventional practice, a clean tank 96 is located over the tank 12 into which is diverted a small volume of clean filtered liquid. The liquid is drained out of the vacuum box by a pump 98 driven by a motor 100. The suction side of the pump 98 is connected to an inlet pipe 102 connected to channel 38. A small proportion of the flow is diverted to the clean tank 96 which fills to the level of a weir 97 and then overflows into a pipe 99 to direct the overflow back into the tank 12. This arrangement eliminates the need for a control valve to stop diversion of clean liquid after the clean tank 96 is refilled.

The pump outlet 106 is connected to piping (not shown) for directing clean liquid to the using equipment and to the clean tank 96, and to a belt cleaning arrangement described below.

A stand pipe 104 allows clean liquid from the clean tank 96 to be drawn out to supply the using equipment and to be reintroduced into the tank 12 when preparing for indexing to neutralize the vacuum created across the belt 24 and allow movement of the belt 24. A check valve allows a small flow back into the channel 38 to neutralize the vacuum in the well known fashion.

Figure 3:
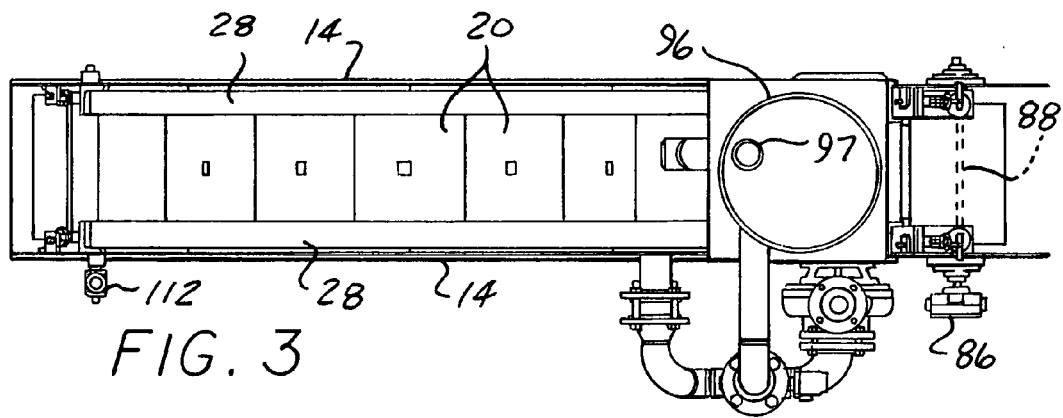
FIG. 3 is a plan view of the apparatus shown in FIGS. 1 and 2.

Some of the filtered liquid is introduced into a channel 108 (FIG. 11) affixed to the partition plate 18 via an opening 110 in a sidewall 14 and piping (not shown) connected to fittings 112 (FIG. 3). Channel 108 is welded or otherwise attached to the underside of partition plate 18.

A machined slot 114 in the plate 18 creates a jetting outflow into the underside of the filter belt 24 to create a cleaning action for each segment of the belt 24 flushing out the solid contaminants as it again descends into the tank 12.

The system controls are not here described in detail, as typical controls are well known and described in the above identified U.S. patents.

To provide an even lower cost filter apparatus, a lower capacity gravity filter 116 can be provided incorporating some of the features of the invention described above in the vacuum filter apparatus, as shown in FIGS. 18-24. Some variations in the components of the filter apparatus are incorporated in this embodiment.

The gravity filter apparatus 116 is designed to have a lower profile so as to be able to be placed under individual machine tools. Covers 119 are provided to prevent splash or the entrance of dirt or trash. A cover opening would normally be made aligned with the location of liquid discharge of a particular machine tool (not shown), and a liquid collector inlet fitted therein A low height rectangular tank 118 is provided, having a bottom plate 120, two sidewalls 122, and two end walls 124, 126 to create a confined space 128 for receiving contaminated liquid and collecting liquid which has been filtered.

The tank interior space 128 is subdivided by a filter media support comprised of a curved perforate plate 130 extending down from either end and affixed to each sidewall 122.

A combined conveyor-filter belt 132 is provided as in the above described filter apparatus, which comprises a strip of woven fabric having its ends joined to form a closed loop and having a series of flight bars 134 attached as with open ended loop pockets 136 sewn or otherwise attached extending across the width of the fabric belt as in the above-described embodiment. The pockets 136 are relatively closely spaced parallel to each other.

A pair of horizontal plates 138 project in from a respective side plate 122 and extends along and over the perforate plate 130 and partially overhanging the side bands of the filter belt 132, and also extend over a respective end 140A, 140B of drive-flight bars 140 received and held in a respective pocket 136 on the filter belt 132.

A pair of short vertical plates 142 extending beneath the plates 138 confine the ends 140A, 140B of the drive-flight bars 140.

A pair of hose seal assemblies 144 overlying the outer edges of the filter belt 132 are also confined by the vertical guide plates 142.

The hose seal assemblies 144 each include an outer sealed compliant hose 146 and an inner tube 148 which hold its round shape. A liquid partially fills the outer hose 146 which extends to a height above the maximum liquid level $L_{MAX}$ in the tank 118.

Figure 22:
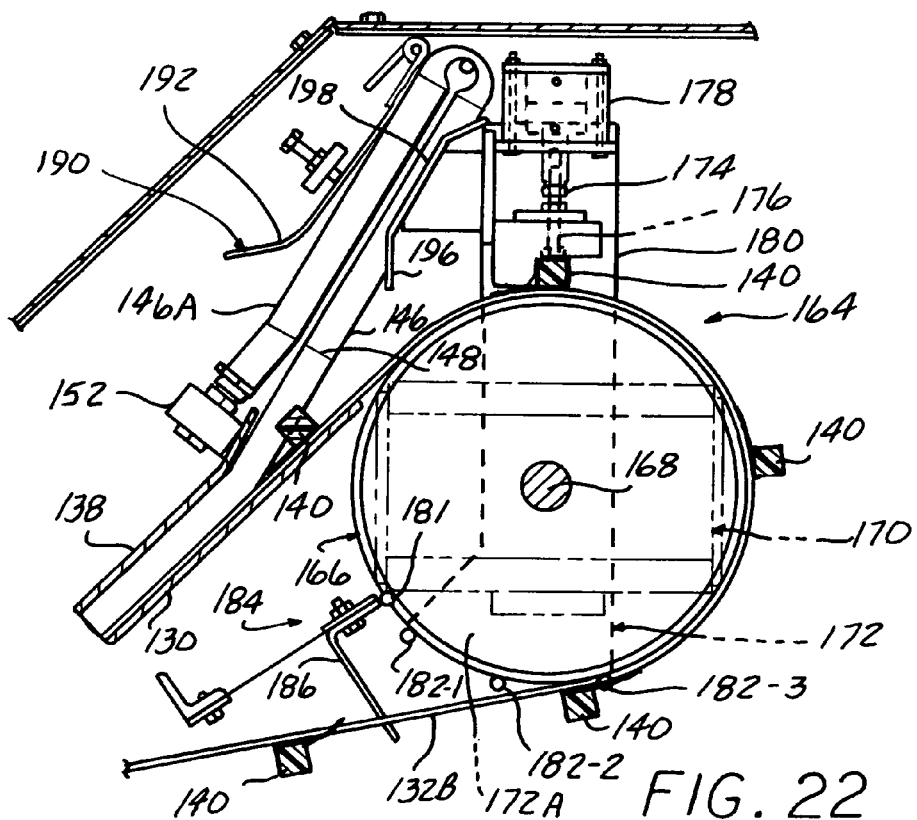
FIG. 22 is an enlarged view of the components in the circle 22 in FIG. 19.

The hoses 146 are each bent back into a U-shape at either end as best shown in FIGS. 22 and 23, with plug assemblies 150, 152 sealing the hoses 146.

A holder fitting 154 holds each bight formed by the upper folded over hose ends.

A pump 156 driven by a motor 158 removes filtered liquid from the collection space 160 in the tank 118 and maintains a minimum level differential.

A liquid level sensor 162 has an end positioned at the lower liquid level $L_{MIN}$ to control the pump operation to keep a sufficient head differential to ensure adequate gravity induced flow through the filter belt 132.

A pair of indexing drive mechanisms 164 is provided on each side of a return idler drum 166 around which the filter belt 132 passes into to be directed back into the tank space 160 beneath the perforate plate 130.

The return idler drum 166 is mounted within an upwardly angled elevated portion 160B at the left side of the tank 118.

The idler drum 166 is free to rotate on a cross shaft 168 which is oscillated by a rotary actuator 170.

Mounted to a respective end of the shaft 168 are a pair of pivot plates 172 each located at a respective end of the drum 155 and fixed to the shaft 168 to be oscillated therewith, included in each of a pair of indexing drive mechanisms 164. The drive mechanisms 164 also each include a plunger assembly, including a plunger 174 mounted to a respective pivot plate 172.

The plunger assemblies each also include an engagement element comprising a stepped block 176 and a linear actuator 178, the plunger assemblies each mounted to an upper portion 180 of a respective pivot plate 172.

Each stepped block 176 is shaped to engage a respective end 140A, 140B of a drive-flight bar 140 when the actuator 178 acts to extend the plunger assembly 174 downwardly as in the above described embodiment.

The rotary actuator 170 is actuated after the drive flight bar 140 aligned beneath the plunger assemblies is engaged by both stepped blocks 176 to rotate both pivot plates 172.

A series of contact rods 182 are affixed to an arcuate bottom portion 172A of each pivot plate 172 which successively engage a beater assembly 184, as in the above described embodiment to cause repeated bending and release of a spring steel sheet 185 clamped at one end to a fixed angle 183 to cause a projecting angle side 186 to strike the return segment 132B of the filter belt 132 to tend to dislodge any entrapped solids in the belt fabric.

A hinged anvil plate 190 which has a flat segment 192 is adjustably located against a threaded step bolt 194 to be positioned against the folded back segment 146A of the sealed hose 146. A squeeze plate 196 also having a flat segment 198 is mounted to each pivot plate 172 and located so as to compress the associated hose 146 and create sealing pressure in the main length thereof exerted on the outer side bands of the filter belt segment 132A.

Figure 24:
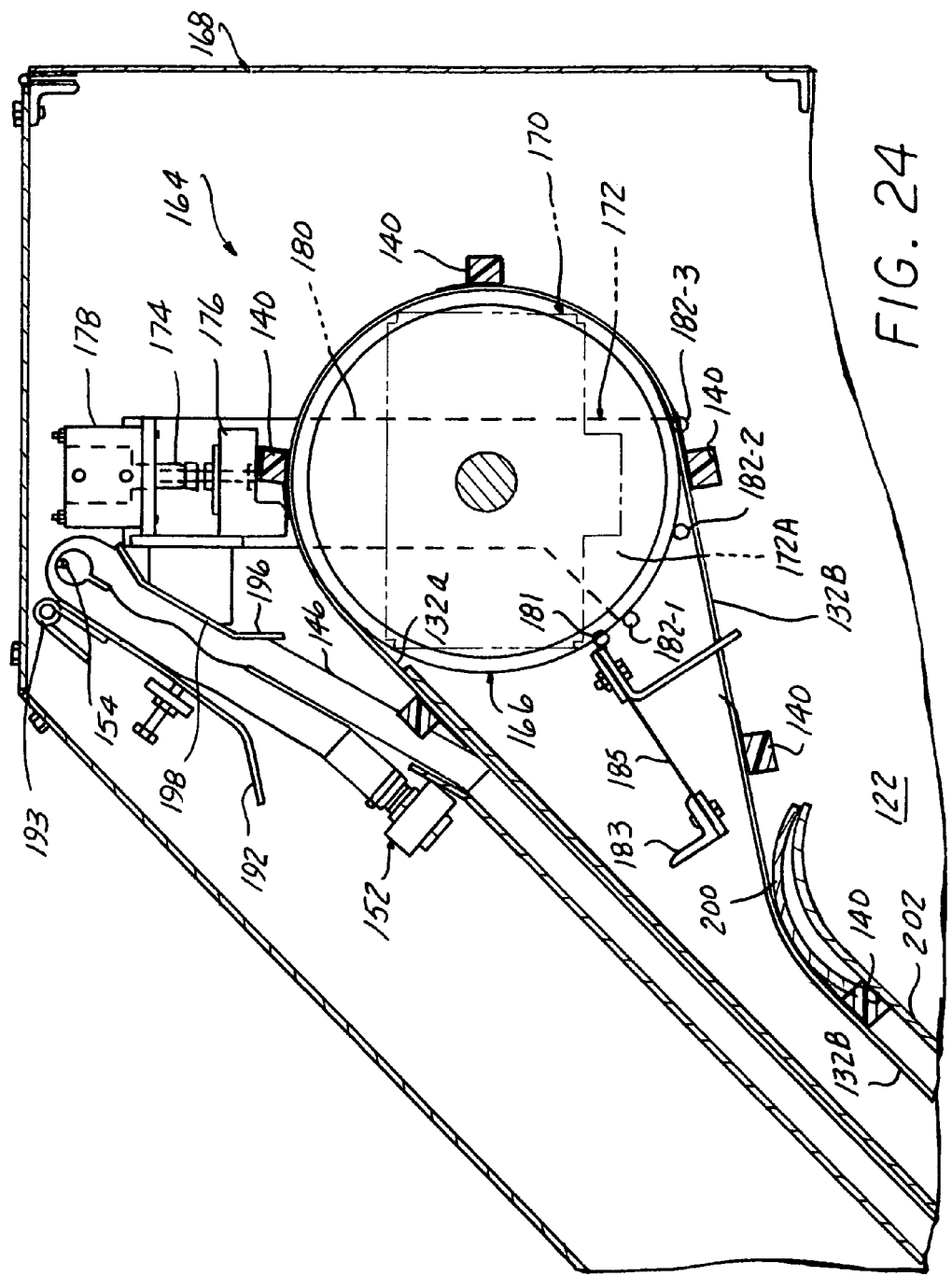
FIG. 24 is a further enlarged view of the components shown in FIG. 24.

In FIG. 24, a pair of curved end guides 200 are shown each fixed to a tank side wall 122 which are located to engage and guide a respective filter belt outer band, while the drive-flight bars 140 engage a main guide plate 202.

The return segment 132B passes around a second idler drum 188 at the left end of the tank 118.

As in the above first described apparatus, a belt washer is located just after the second idler drum 188 to direct a spray of clean liquid at the inside of the filter belt advancing segment 132A.

Suitable controls cause a periodic operation of the indexing mechanism to incrementally advance the upper segment of the filter belt 132A to the right.

FIGS. 24A to 24I show the steps of each indexing cycle.

Figure 24A:
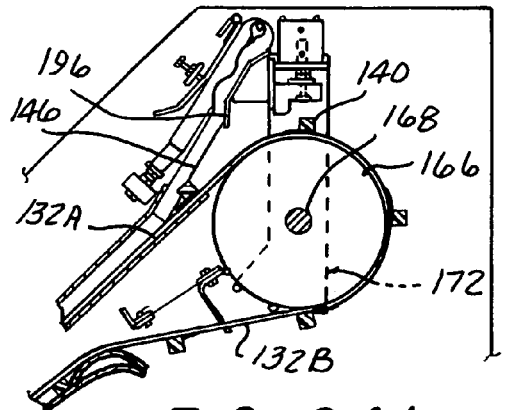
FIGS. 24A-24I are diagrammatic views of the operation of the belt indexing components shown in FIG. 24 and included in the filter apparatus shown in FIG. 18.

In FIG. 24A, the plunger assembly is inactivated and a drive flight bar 140 is located just ahead of the stepped feature. This relationship is insured by setting the rotary stroke to be slightly greater than the pitch between the drive-flight bars 140.

In this initial position, the squeeze plates 196 are compressing both of the hoses 146 to expand the remaining lengths thereof, generating a sealing pressure on the filter belt outer edges.

Figure 24B:
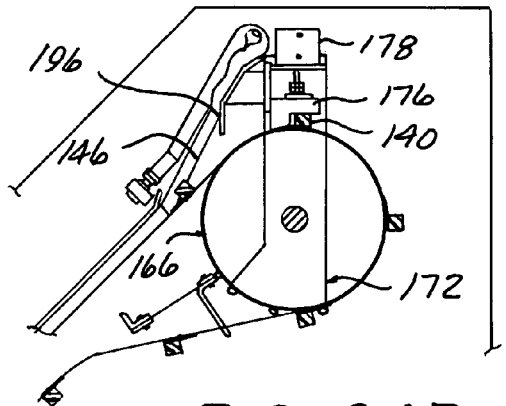

In FIG. 24B the linear actuator 178 has been activated to bring the stepped block engagement element 176 down against the top of the guide-flight bar 140. As noted, the trailing side of the drive-flight bar 140 is located slightly ahead at the end of the previous indexing cycle to insure proper engagement with the stepped block 176.

The hoses 146 remain compressed by the squeeze plates 196.

Figure 24C:
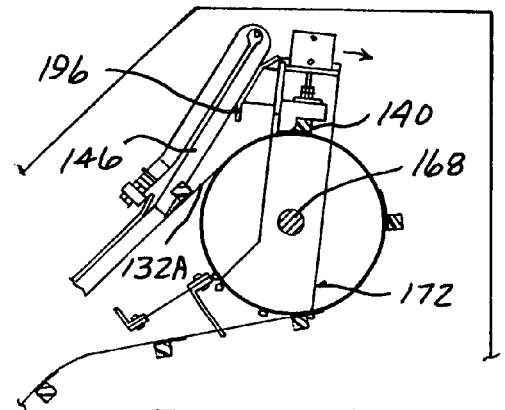

In FIG. 24C the rotary actuator 170 has rotated the shaft 160 and pivot plates 172 clockwise to engage and slightly advance the drive-flight bar 140, pulling the filter belt 132 around the idler drum 172. The squeeze plates 196 have at the same time been advanced to move away from the hoses 146, so that the filter belt 132A has been released to be freely movable.

Figure 24D:
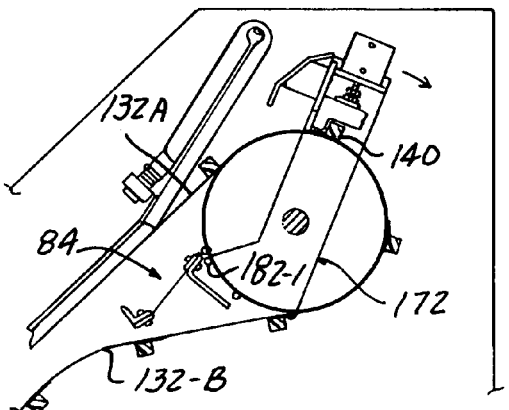

In FIG. 24D, the first rod contacts 182-1 have pushed the beater bar 184 back by continued advance of the pivot plates 172 and the filter belt 132 has further advanced.

Figure 24E:
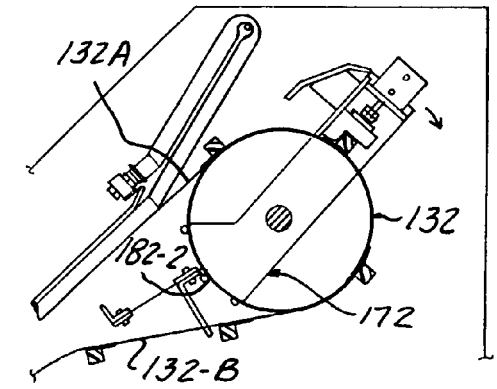

In FIG. 24E, the beater bar 184 has been released to impact the filter belt segment 132B to knock out retained solids (collected in a receptacle not shown) while the filter belt 132 is further advanced.

Figure 24F:
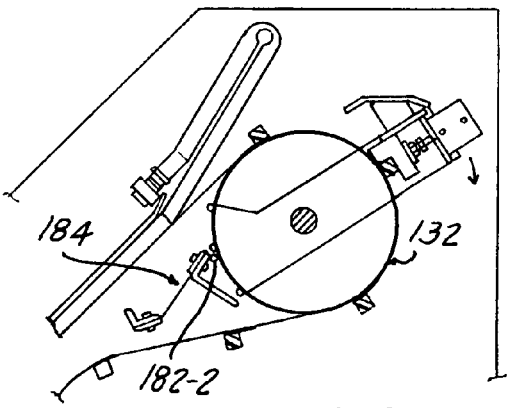

In FIG. 24F, the second rod contacts 182-2 have engaged the beater bar 184 and deflected the same back, while the filter belt 132 is further advanced.

Figure 24G:
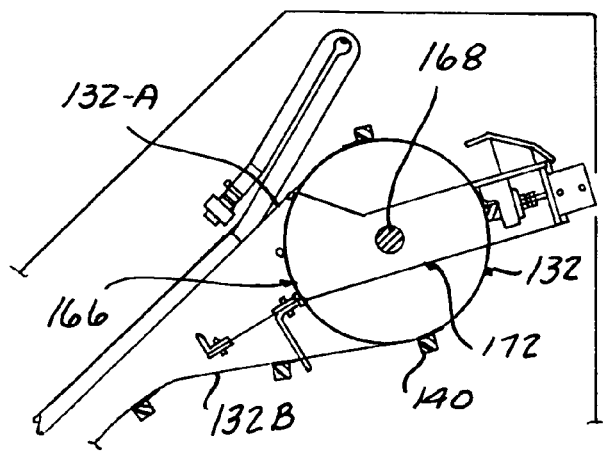

In FIG. 24G, the filter belt 132 is further advanced, and the third rod contacts 182-3 engage the beater bar 184.

Figure 24H:
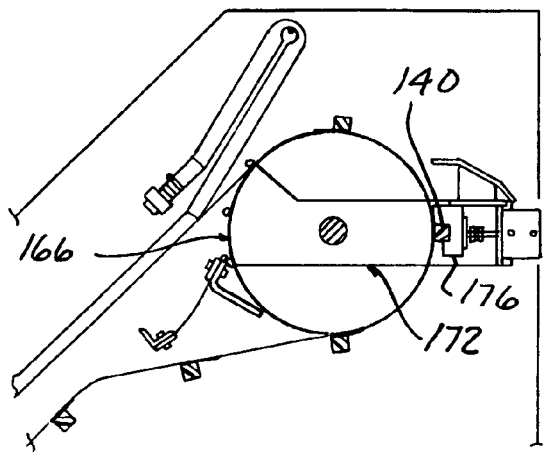

In FIG. 24H, the pivot plate 172 has been rotated almost to its fullest extent and the beater bar 184 has been deflected back.

Figure 24I:
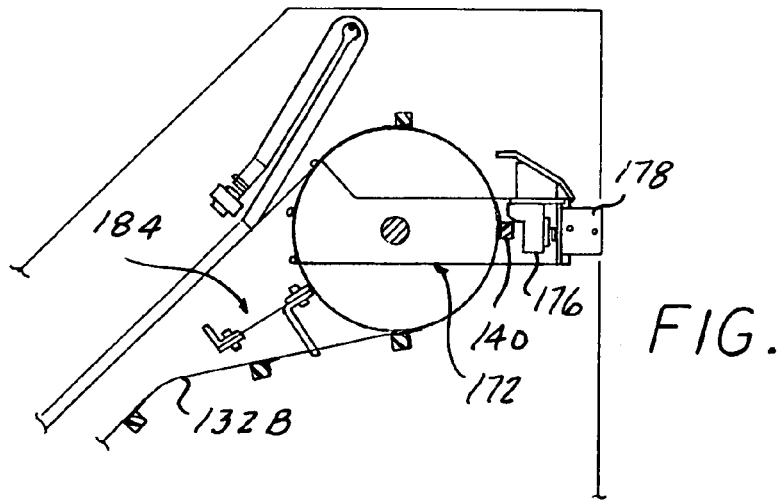

In FIG. 24I, the beater bar 184 has been released to again impact the filter belt segment 132B as the pivot plate 172 reaches its fullest extent of advance and the linear actuator 178 has against retracted the stepped block 176 to disconnect the pivot plate 172 from the drive-flight bars 140 and filter belt 132 and allow it to be returned to the start position ready for the next cycle.

The filter belts are preferably monofilament fabrics. Monofilament fabrics are made by weaving single extruded filaments in both the warp and weft directions to create unique fabrics. The fabrics have precise and measurable opening sizes and can therefore be rated in microns. These fabrics have high flow rates and low-pressure drops compared to multifilament fabrics. Monofilament fabrics capture particles on their surface, have excellent particle release and are easy to clean. Monofilament fabrics have high stiffness so they have less tendency to wrinkle. Monofilament fabrics also have high tensile strength and less tendency to stretch.

Fabrics can be made of many different materials, based upon the application; polyester, nylon, polypropylene, PTFE or others.

The most common fabric weaves are satin or twill because they give a smooth surface on the product capture side of the belt. Another weave which is very useful in the embodiments of the invention is the "double layer weave" which is produced by simultaneously weaving a fine filter mesh together with a coarse support mesh. The two layers are woven together in the loom to form a two layer composite fabric that allows for high throughput and fine particle capture efficiency as well as reduces wrinkling and stress failures. The double layer weave allows a heavy fabric to have a fine weave, which is a major advantage, since it is durable and strong to wear well, yet can remove fine solids.

SEFAR AMERICA weaves and supplies fabrics which may be used in the filter apparatus as described above.

Examples of these fabrics are:

07-1005-W1118: Single layer, polyester, monofilament, satin weave, fabric with 118 micron openings, 740 microns thick, 12.7 oz./yd weight;

07-84323W060: Double layer, polyester, monofilament fabric, 60 microns opening, 780 micron thickness, 10.2 oz./yd2 weight; and 07-9001-K020: Double layer, polyester, monofilament fabric, 20 microns opening, 825 micron thickness, 19.5 oz./yd2 weight.

It is also desirable to treat the filter belt edges by impregnating, the same with liquid polyurethane to seal the interstices and improve sealing. A two-part liquid polyurethane can be applied to the edges and compressed in a press to fill the internal spaces. This makes these edges impervious to liquids and also providing a smooth surface to reduce frictional drag when indexing.

Figure 16:
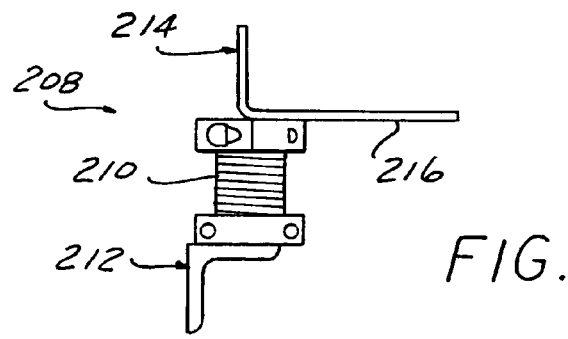
FIG. 16 is an end view of an alternate form of a belt beater assembly included in the filter apparatus shown in FIG. 1.
Figure 17:
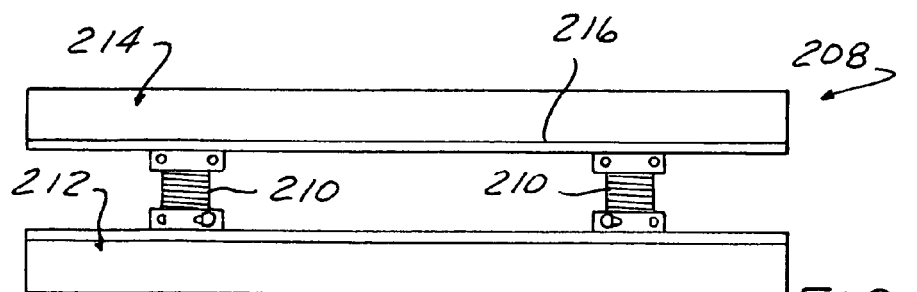
FIG. 17 is an elevational view of the beater assembly shown in FIG. 16.
Figure 18:
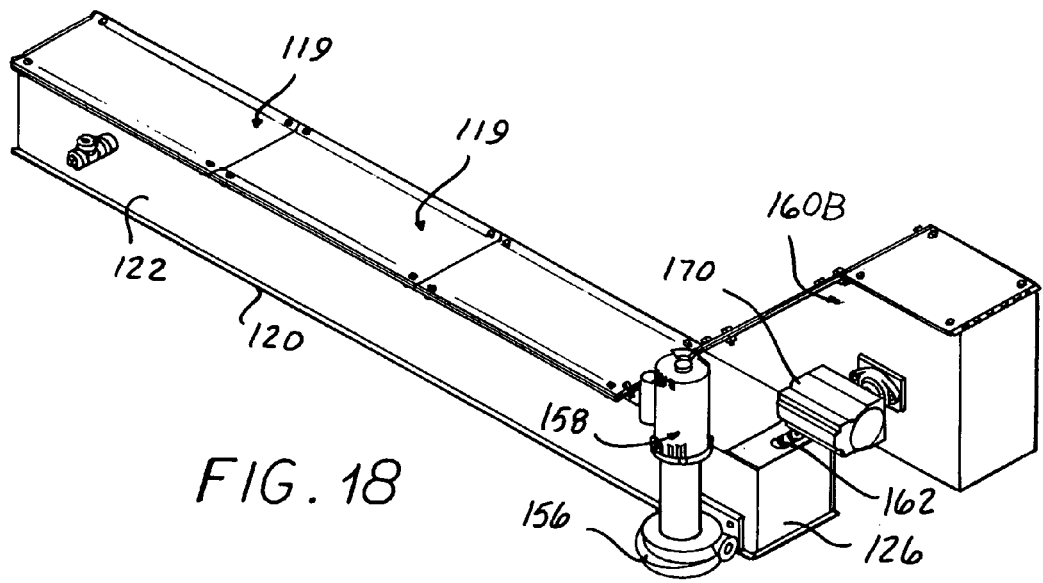
FIG. 18 is a pictorial view of a gravity type filter apparatus according to another embodiment of the invention with one side wall of the tank removed to show the components inside the tank.

FIGS. 16 and 17 show an alternate form of beater bar 208 which doesn't employ the spring steel blade to generate a spring force. Such blades can corrode in a watery environment Rather a pair of coil springs 210 connect a mounting angle 212 fixed extending between the two sides 122 of the tank and a beater angle 214. Beater angle 212 has a longer projecting side 216 which strikes the filter belt after the springs 210 are stretched when the angle 212 is engaged and released by contacts on the pivot plate 172 in the manner described.

The invention claimed is:

1. A filter apparatus including:
    a tank having an interior space adapted to receive and contain a liquid containing solids to be filtered out;
    a closed loop filter belt having a segment extending within said tank space;
    a filter belt support located within said tank interior space and on which said segment of said filter belt is supported, said filter belt support having openings allowing liquid passing through said filter belt to be filtered to pass into a separate collection space in said tank;
    a pump drawing filtered liquid out of said collection space for reuse;
    said filter belt having a return segment connected to said one segment to allow periodic indexing movement thereof to bring successive sections onto said filter belt support and advance other sections out of said interior space to allow discharge of filtered solids deposited on said filter belt;
    said filter belt passing around a filter belt support at either end to allow circulation of said filter belt back into said tank interior space by successive indexing movements of said filter belt;
    said filter belt having a series of spaced apart parallel drive-flight bars mounted thereto along the length thereof, each bar extending across said filter belt;
    an indexing drive mechanism periodically acting on said filter belt by successively engaging each of said drive-flight bars and advancing said engaged drive-flight bar and thereby said closed loop filter belt to cause said indexing movement of said filter belt, said indexing drive mechanism including at least one extendible member carrying an associated engagement element, said indexing drive mechanism operable to extend and retract said extendible member to bring said engagement element into and out of engagement with each successive one of said filter belt drive-flight bars as said indexing movement of said filter belt proceeds and said indexing drive mechanism advancing said extendible member while in engagement with said successive one of said drive-flight bars to carry out indexing of said filter belt.

2. The apparatus according to claim 1 wherein said element comprises a block having a stepped shape engaging a drive-flight bar during each operation of said drive mechanism indexing.

3. The apparatus according to claim 1 wherein said indexing drive mechanism includes a pivot member mounted to pivot about an axis of one of said filter belt rotary supports, said extendible member carried on said pivot member spaced from said filter belt passing around said rotary support and carrying said engagement element into engagement with a drive-flight bar on said one rotary support, and further including an actuator for pivoting said pivot member from a start position to an advanced position to produce periodic indexing movement of said filter belt.

4. The apparatus according to claim 1 wherein two indexing drive mechanisms are included each having an extendible member each member carrying an associated engagement element aligned with a respective end of each drive-flight bar engaged thereby.

5. The filter apparatus according to claim 4 wherein two pivot members are included, each associated with a respective index mechanism, an actuator pivoting said pivot members from a start position to cause indexing of said filter belt, and further including a pair of elongated hose seals extending along a respective said guide surface extending over a respective side edge of said filter belt, said hose seals each comprising a sealed collapsible hose partially filled with a liquid; said pivot members each carrying a seal compressing member compressing a section of a respective hose seal when in said initial position and released from engagement with said hose seal section when said pivot member is actuated by moving said seal compressing member away from said respective hose seal section.

6. The apparatus according to claim 4 wherein each of said drive-flight bar ends is spaced inwardly from a respective outer edge of said filter belt.

7. The apparatus according to claim 6 wherein each of said drive-flight bars are mounted to said filter belt by being received in a respective one of a series of pockets attached to an outer surface of said filter belt, said drive-flight bars each slidably received in a respective pocket with opposite ends protruding from a respective side of a respective pocket.

8. The filter apparatus according to claim 6 wherein said drive-flight bars are spaced apart a distance of approximately 8 inches.

9. The filter apparatus according to claim 6 wherein a pair of guide surfaces extend along the path of said filter belt confining said ends of said drive-flight bars to maintain the position of said one segment of said filter belt in said tank overlying said filter belt support.

10. A filter apparatus including:
    a tank having an interior space adapted to receive and contain a liquid containing solids to be filtered out;
    a closed loop filter belt having a segment disposed to extend within said tank interior space;
    filter belt support located within said tank interior space and over which said segment of said filter belt extends, said filter belt support having openings allowing liquid passing through said belt to be filtered to pass into a collection space in said tank;
    a pump drawing filtered liquid out of said collection space;

said filter belt having a return segment connected to said one segment to allow periodic indexing movement to bring successive sections thereof onto said filter support and advance other sections thereof out of said interior space to allow discharge of filtered solids deposited on said filter belt during filtering;

said filter belt passing around a rotary filter belt supports at each end of said tank to allow return of said filter belt back into said tank;

a pair of elongated hose seals, each having sections extending along a respective support surface extending along a respective side edge of said filter belt on which the edges of said belt segment passes when said filter belt is indexed, said hose seals each comprising a sealed collapsible hose partially filled with a liquid;

a seal compressing member for each hose seal movably mounted to be able to be advanced to engage and compress a section of each hose seal which is not engaged with a side edge of said belt when said filter belt is at rest so as to expand said sections of each of said hose seals extending along a side edge of said filter belt to sealingly engage said side edges of said filter belt and to be able to be retracted to release said compression of said not engaged sections of said hose seals when said filter belt is indexed by moving said seal compressing member away from said not engaged sections of said hose seals, and an actuator for moving each of said seal compressing members into and out of contact with said hose seals sections.

11. The filter apparatus according to claim 10 wherein each of said hose seals include a smaller inner tube partially filling the interior of each of said hose seals to partially inflate said hose seals.

* * * * *